*Waterhouse & McKenney,*
*Horse shoe.*
*N°. 98,323.* *Patented Dec. 28, 1869.*
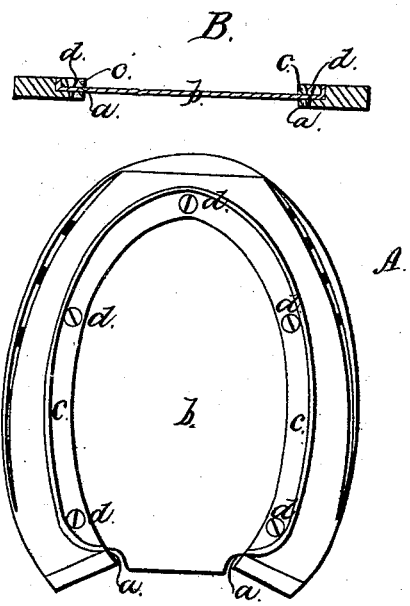
Witnesses.
Henry C. Houston
Wm Franklin Seavy
Inventor.
Thos Waterhouse
G. F. McKenney
Per Wm H Clifford atty.

United States Patent Office.

THOMAS WATERHOUSE, OF WEST GORHAM, AND CHARLES F. McKENNEY, OF SACO, MAINE.

Letters Patent No. 98,323, dated December 28, 1869.

IMPROVEMENT IN HORSESHOE.

The Schedule referred to in these Letters Patent and making part of the same.

*To all whom it may concern:*

Be it known that we, THOMAS WATERHOUSE, of West Gorham, in the county of Cumberland, and State of Maine, and CHARLES F. McKENNY, of Saco, in the county of York, and State of Maine, have invented a new and useful Improved Horseshoe; and we hereby declare the following to be a full, clear, and exact description thereof, which will enable others to make and use our invention, reference being had to the accompanying drawings, forming part of this specification, in which—

A shows a bottom view of a horseshoe, with our improvement attached thereto.

B shows a transverse sectional view of the same.

Same letters show like parts.

Our invention is intended to obviate the liability to accident to which horses are exposed when driven, in the winter, over roads covered with snow, which frequently accumulates in the hollows of the horses' feet, so as to produce large balls or bunches of hardened or "packed" snow, filling the space between the walls of the hoof, and projecting below the bottom of the hoof and shoe, rendering the animal much more liable to slip and fall, &c., and also having a tendency to produce lameness, by its pressure upon the interior parts, or frog and sole of the hoof.

In addition to these, there are other dangers arising from "balling up," as it is termed, which it is unnecessary to fully explain, but which are familiar to those accustomed to the use of horses.

A device has already been invented to prevent the accumulation of snow in the interior of horses' hoofs, consisting of a piece or sheet of rubber, placed loosely between the shoe and the bottom of the hoof, but in practice this has been found to be imperfect in its operation, as, from the elasticity of the substance employed, and its place between the hoof and the shoe, the motion of the animal tends to loosen, and ultimately to work out the nails which attach the shoe to the walls of the hoof. Our invention is intended to be applied so as to obviate this objection.

Its construction and application is as follows:

In an ordinary horseshoe, a channel or groove is cut out all around the inner edge thereof, to a sufficient depth. Into this groove is fitted a sheet of rubber, or any elastic substance, occupying the entire space between the sides of the shoe, and covering and protecting the interior hollow part of the hoof. Upon this sheet of rubber we place a strip, flange, or guard of metal, to cover that part of the elastic substance occupying the groove. This strip or flange serves to secure the elastic substance, and hold it in its proper place, and is secured, by screws or other means, to the body of the shoe below the groove, the screws, &c., passing through the rubber and into the steel of the shoe.

This device effectually prevents "balling," and thus enables a horse to travel in deep, loose snow with much more ease and with less liability to accident.

Should the elastic substance be torn or broken by any means, or worn out by use, it can be readily removed, by taking out the screws which hold the strip or flange of metal to the body of the shoe, when the same may be taken off, the elastic substance taken out, a new piece introduced, and the metal strip again screwed down, and it is evident all this may be accomplished without removing the shoe from the hoof.

In the accompanying drawings—

*a* shows the position of the groove.

*b* shows the elastic substance.

*c*, the strip of metal confining it.

*d*, the screws therein.

What we claim as our invention, and desire to secure by Letters Patent, is—

The arrangement, on a horseshoe, of the groove *a*, metallic strip *c*, screws *d*, and elastic sheet *b*, secured as described, and for the purposes set forth.

THOMAS WATERHOUSE.
CHARLES F. McKENNEY.

Witnesses:
WM. H. CLIFFORD,
HENRY C. HOUSTON.